United States Patent [19]

Segoshi et al.

[11] Patent Number: 5,194,779
[45] Date of Patent: Mar. 16, 1993

[54] HEADLIGHT ASSEMBLY FOR A VEHICLE

[75] Inventors: Tohru Segoshi, Yokohama; Takashi Ashida, Zama, both of Japan

[73] Assignee: Nissan Motor Co., Ltd., Yokohama, Japan

[21] Appl. No.: 737,012

[22] Filed: Jul. 29, 1991

[30] Foreign Application Priority Data

Jul. 31, 1990 [JP] Japan .................. 2-202786

[51] Int. Cl.$^5$ .............. B60Q 1/02; B60L 1/14
[52] U.S. Cl. ...................... 315/82; 315/83; 307/10.8
[58] Field of Search ............. 315/82, 83, 77; 307/10.8; 362/228

[56] References Cited

U.S. PATENT DOCUMENTS

| | | | |
|---|---|---|---|
| 3,558,972 | 1/1971 | Arai | 315/83 |
| 3,702,415 | 11/1972 | Schultz | 315/82 |
| 4,495,444 | 1/1985 | Thomas | 315/82 |
| 4,513,357 | 4/1985 | Nieda et al. | 315/83 X |
| 4,857,754 | 8/1989 | Yamamoto | 307/10.8 |

FOREIGN PATENT DOCUMENTS 59134020 8/1989 Japan .

*Primary Examiner*—Eugene R. LaRoche
*Assistant Examiner*—Son Dinh
*Attorney, Agent, or Firm*—Foley & Lardner

[57] ABSTRACT

A headlight assembly including a pair of headlight units each having first and second headlights. The first headlight has a halogen bulb having a high-beam filament for illuminating a range faraway from the vehicle and an auxiliary low-beam filament for illuminating a range in the vicinity of the vehicle. The second headlight has a discharge bulb for a low-beam for illuminating a range in the vicinity of the vehicle. The headlight assembly further includes a lighting control circuit for controlling lighting and turning-off of these headlights in such ways that both the bulbs of the first and second lamps are lighted during main lighting which illuminates the range faraway from the vehicle with a high-beam and the range close to the vehicle with a low-beam, that the bulbs of the second headlights are lighted during dimmer lighting which illuminates the range in the vicinity of the vehicle with a low-beam, and that only the bulbs of the first headlights are lighted during passing. The headlight assembly further includes a detector provided in the lighting control circuit for detecting that either of the discharge bulbs of the second headlights of the headlight units is unlighted or turned-off, and a relay provided in the lighting control circuit for supplying electrical power to the auxiliary low-beam filament of the first headlight of the headlight unit when the detector detects that the discharge bulb of the second headlight of the headlight unit is unlighted or turned-off, to cause the auxiliary low-beam filament to illuminate.

8 Claims, 3 Drawing Sheets

HEADLIGHT ASSEMBLY FOR A VEHICLE

BACKGROUND OF THE INVENTION

1. Field of the Invention

This invention relates to a headlight assembly for a vehicle, and in particular to a headlight assembly for a vehicle comprising a pair of headlight units each having first and second headlights and a lighting control circuit for these headlights.

2. Description of the Prior Art

A conventional headlight uses a halogen bulb or a discharge bulb as a light source thereof. A headlight using a halogen bulb has an advantage that response speed is superior since a target amount of light can be obtained in a short time after applying a voltage to a filament thereof. On the other hand, however, there is the disadvantage that a large amount of electrical power is consumed when used.

A headlight using a discharge bulb has an advantage that the amount of light is large relative to the amount of electrical power consumption. As a result, it is possible to compact the size of the headlight by reducing the size of a reflector of the headlight. Further, there is also an advantage that the degree of durability is superior in comparison with a halogen lamp. On the other hand, however, there is the disadvantage that repeated switching on and off causes a shortened life. Further, there are also disadvantages that this type of headlight is inferior in responsiveness since arc discharge is required at the start of lighting, and that the lowering of supply voltage would occasionally cause turning-off or unlighting of the bulb.

In view of the advantages of these two types of bulbs, an improved headlight assembly which utilizes these two types of bulbs has been developed, which is for example disclosed in Japanese Patent Laid-Open Publication No. 134020/1984.

The developed headlight assembly comprises a pair of headlight units provided on left and right sides of a front portion of a vehicle, respectively, and a lighting control device for the headlight units. Each of the headlight units includes a first headlight having a single-filament halogen bulb and a reflector and a second headlight having a discharge bulb and a reflector, thus this headlight assembly is called a four headlights type. In this conventional four headlights type headlight assembly, the discharge bulbs are turned on during dimmer lighting which illuminates a range in the vicinity of the vehicle with low-beam. During main lighting which illuminates a range faraway from the vehicle with a high-beam, the halogen bulbs are turned on.

In the meantime, recently compactification of the size of the headlight assembly, especially the vertical length of the headlight unit, is requested in view of improvement of the design and appearance of a vehicle. In such a case, this conventional headlight assembly does not satisfy the request. Namely, in order to reduce the vertical length of the headlight unit, it is also necessary to reduce the vertical length of a reflector of each headlight. A reflector having a reduced vertical length may be suitable for the discharge bulb due to one of the advantages of the discharge bulb, i.e. its large amount of light with respect to the power consumption. However, this reduced size reflector is insufficient for the halogen bulb to produce a sufficient amount of light during the main lighting with the electrical power suitable to the discharge bulb. Namely, as stated hereinabove, the halogen bulb requires a relatively large amount of electrical power to be consumed. Therefore, it is difficult for the halogen bulb to produce a sufficient amount of light during the main lighting with the reduced size reflector and the electrical power suitable to the discharge bulb. For this reason, it has been difficult to shorten or reduce the vertical length of the headlight unit in the conventional headlight assembly.

In order to reduce the vertical length of each headlight unit, it may be proposed that both the discharge bulbs and the halogen bulbs be illuminated during the main lighting. However, in such a proposed headlight assembly, there is a problem that if passing is effected by repeatedly flashing the headlights, for instance, as a warning signal when overtaking a vehicle running in front of the vehicle, the discharge bulbs also have to be repeatedly switched on and off, thus resulting in shortening the discharge bulbs' life for the reason stated above.

SUMMARY OF THE INVENTION

In view of the above problem, a main object of this invention is to provide a compact headlight assembly for a vehicle, which is capable of providing a desired amount of light not only at the main lighting but also at the dimmer lighting with an improved degree of durability.

Another object of the present invention is to improve reliability in driving a vehicle and lighting the headlights thereof.

In order to achieve the main object, a headlight assembly according to the present invention comprises a pair of headlight units each having a first headlight and a second headlight. The first headlight includes a halogen bulb having a high-beam filament for illuminating a range faraway from the vehicle and a second headlight having a discharge bulb for low-beam for illuminating a range in the vicinity of the vehicle. The headlight assembly further includes a lighting control means for controlling lighting and turning-off of the headlights in such ways that both the bulbs of the first and second lamps are lighted during main lighting which illuminates both the range faraway from the vehicle with a high-beam and the range close to the vehicle with a low-beam, that the bulbs of the second headlights are lighted during dimmer lighting which illuminates the range in the vicinity of the vehicle with a low-beam, and that only the bulbs of the first headlights are lighted during passing.

According to the headlight assembly of the present invention, both the bulbs of the first and second lamps are lighted during the main lighting. Therefore, it becomes possible to obtain a sufficient amount of light during the main lighting even if a relatively small reflector is used in each first headlight having the halogen bulb, thus resulting in compactification of the headlight unit. Further, during passing, only the first headlights having the halogen bulbs are used and the discharge bulbs of the second headlights are not used, therefore repeated switchings for effecting passing will not affect the discharge bulbs. Consequently, the invention overcomes the disadvantage as stated above, thus resulting in lengthening the life of the discharge bulbs.

Further, in order to achieve another object, the headlight assembly of the present invention further comprises an auxiliary filament for a low-beam which is provided in the halogen bulb of each first headlight in addition to the high-beam filament, and means for detecting unlighting of the discharge bulb of each second headlight and means for supplying electrical power to the auxiliary filament in the first headlight in response to the detected signal from the detecting means. The detecting means and the supplying means are provided in the lighting control means.

According to this headlight assembly, even if the discharge bulb of each second headlight is unlighted or fading off by any causes, the auxiliary filament in the halogen lamp of the first headlight will be automatically substituted for the discharge bulb. As a result, the driver can continue to drive the vehicle without any difficulties even if such an occurrence would occur thus leading to improved reliability of the vehicle.

DETAILED DESCRIPTION OF THE PREFERRED EMBODIMENTS

Referring now to the accompanying drawings, preferred embodiments of the present invention will be explained.

Figure 1:
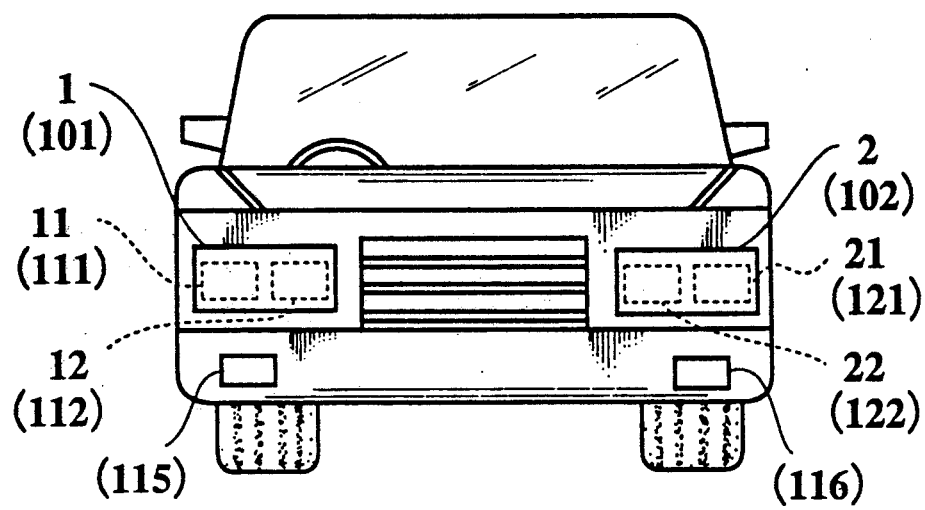
FIG. 1 is a front elevation view showing a front portion of a vehicle equipped with a headlight assembly of the present invention.

FIG. 1 is a front elevation view showing a front portion of a vehicle in which a headlight assembly according to the present invention is provided. The headlight assembly includes a pair of headlight units 1 and 2, which are positioned on the left and right sides of the front portion of the vehicle, respectively. Each of the headlight units 1 and 2 comprises first and second headlights 11, 12 and 21, 22. The left side headlight unit 1 is shown in FIG. 2.

Figure 2:
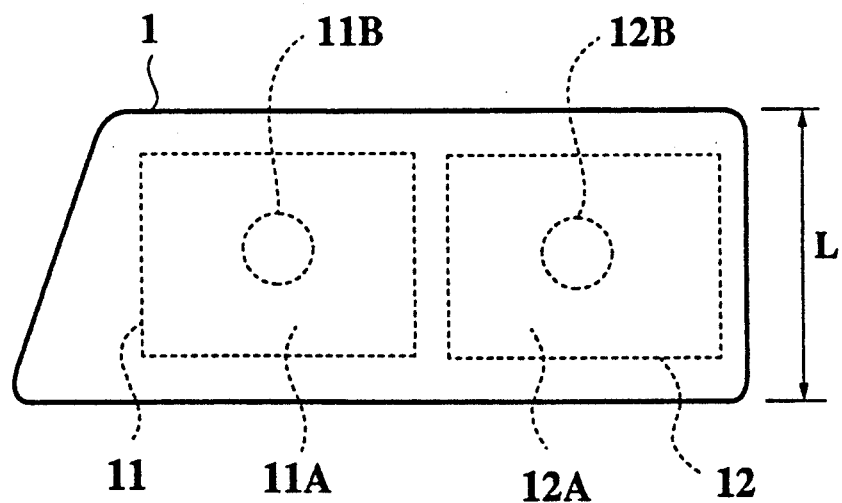
FIG. 2 is a schematic representation of one of the headlight units of a headlight assembly according to a first embodiment of the present invention, which is positioned on the left side of the front portion of the vehicle.

As clearly illustrated in FIG. 2, the first headlight 11 of the headlight unit 1 includes a reflector 11A and a halogen bulb 11B equipped with a high-beam filament 13a for illuminating a range faraway from the vehicle and an auxiliary low-beam filament 13b for illuminating a range in the vicinity of the vehicle. Namely, the halogen bulb 11B is constituted as a so-called double filaments type. The auxiliary low-beam filament 13b is adapted to be lighted only when the second headlight 12 is in out of order.

The second headlight 12 of the headlight unit 1 includes a reflector 12A and a discharge bulb 12B equipped with electrodes for illuminating a range in the vicinity of the vehicle with a low-beam. Each of the reflectors 11A and 12A of this headlight unit 1 has a reduced vertical length in comparison with that of the conventional ones. Therefore, it becomes possible to reduce or shorten the vertical length "L" of the headlight unit 1, which results in compactification thereof.

The other headlight unit 2 having first and second headlights 21 and 22 also has the same structure as that of the headlight unit 1. Therefore, the detailed explanation thereof has not been repeated.

Figure 3:
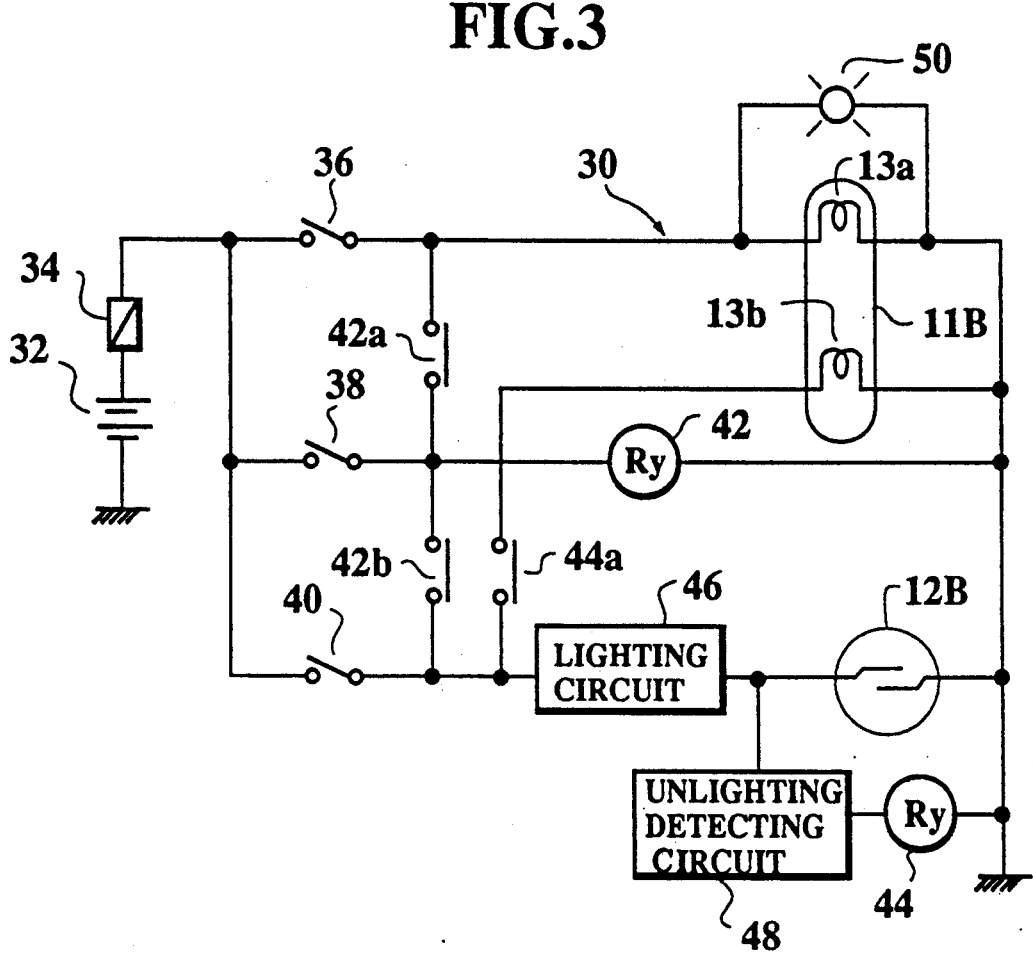
FIG. 3 is a circuit diagram of a lighting control circuit of the first embodiment.

FIG. 3 shows a lighting control circuit 30 for controlling the lighting and turning-off of the headlights 11, 12 and 21, 22 of the headlight assembly. In this regard, it should be noted that the first and second headlights 21, 22 of the other headlight unit 2 have been omitted from the drawing in order to simplify the explanation.

In the drawing, the reference numeral 32 designates a battery for supplying power to the headlight assembly. One end of the battery 32 is grounded and the other end is connected to a fuse 34 for protecting the lighting control circuit 30 from an excessive current produced when a bulb or the like is short-circuited. The other end of the fuse 34 is connected to the lighting control circuit 30.

Namely, the other end of the fuse 34 is connected to one end of a passing switch 36, one end of a main switch 38 and one end of a dimmer switch 40, respectively. The passing switch 36 is turned on when passing is to be effected, the main switch 38 is turned on when the main lighting is to be made, and the dimmer switch 40 is turned on when the dimmer lighting is to be made.

The other end of the passing switch 36 is connected to one end of the high-beam filament 13a of the halogen bulb 11B of the first headlight 11 of the headlight unit 1 and is also connected to the other end of the main switch 38 through a normally open relay contact 42a. The other end of the main switch 38 is connected to the other end of the dimmer switch 40 through a normally open relay contact 42b. The other end of the main switch 38 is also connected to one end of a relay 42 which will be operated so as to close the relay contacts 42a and 42b when the main switch 38 is turned on.

The other end of the dimmer switch 40 is also connected to one end of the auxiliary low-beam filament 13b of the halogen bulb 11B of the first headlight 11 through a normally open relay contact 44a. The other end of the dimmer switch 40 is also connected to an input terminal of a lighting circuit 46. The lighting circuit 46 is constituted from a known circuit, thus detailed explanation thereof has been omitted. An output terminal of the lighting circuit 46 is connected to one of the electrodes of the discharge bulb 12B of the second headlight 12. An input terminal of an unlighting detecting circuit 48 is connected between the output terminal of the lighting circuit 46 and the discharge bulb 12B. The unlighting detecting circuit 48 includes a comparator which senses a discharge current from the discharge bulb 12B and makes a decision that the discharge bulb 12B is unlighted or turned off when the discharge current is below a predetermined value. One end of a relay 44 is connected to an output terminal of the unlighting detecting circuit 48. The relay 44 is operated so as to close the relay contact 44a to illuminate the low-beam filament 13b of the halogen bulb 11B when the unlighting detecting circuit 48 detects that the discharge bulb 12B is turned off or unlighted. The reference numeral 50 designates a high-beam indicator which illuminates when the high-beam filament 13a is used. The high-beam indicator 50 is connected to the opposite ends of the high-beam filament 13a. The other end of the high-beam filament 13a, the other end of the low-beam filament 13b, the other end of the relay 42, the other electrode of the discharge bulb 12B and the other end of the relay 44 are connected together and then grounded.

The operation of the headlight assembly according to the first embodiment will now be described hereinbelow.

During the dimmer lighting, electrical power is supplied from the battery 32 to the lighting circuit 46 when the dimmer switch 40 is turned on. Then, the lighting circuit 46 is activated to illuminate the discharge bulb 12B in such a way that the discharge bulb 12B illuminates an area in the vicinity of the vehicle with a low-beam.

During the main lighting, the relay 42 is operated so as to close the relay contacts 42a and 42b when the main switch 38 is turned on. Then, electrical power is supplied from the battery 32 to the lighting circuit 46 via the main switch 38 and the contact 42b, whereby the discharge bulb 12B is illuminated in the same manner as in the dimmer lighting. In this case, the electrical power is also supplied from the battery 32 to the high-beam filament 13a of the halogen bulb 11B via the contact 42a to cause the halogen bulb 11B to illuminate with a high-beam. Thus, the ranges both close to and faraway from the vehicle are illuminated by the low-beam irradiated from the discharge bulb 12B and the high-beam from the halogen bulb 11B, which results in providing a sufficient amount of light in spite of the reduced size of the reflectors of the headlights of the headlight units.

In the case of passing, electrical power is supplied from the battery 32 exclusively to the high-beam filament 13a of the halogen bulb 11B by repeatedly turning the passing switch 36 on and off, whereby the range distant from the vehicle is illuminated with a high-beam irradiated from the halogen bulb 11B.

During either the dimmer lighting or the main lighting, even if the discharge bulb 12B of the second headlight 12 is turned off or fades away by any causes or the bulb 12B is not illuminated in spite of turning on either the main switch 38 or the dimmer switch 40, the unlighting detecting circuit 48 senses that the discharge bulb 12 is unlighted and then turns the relay 44 on. When the relay 44 is turned on, the relay contact 44a is closed.

As a result, under the main lighting in which the main switch 38 has already been turned on, electrical power is supplied from the battery 32 to the auxiliary filament 13b by way of the main switch 38, the relay contact 42b and, the relay contact 44a, so that the low-beam filament 13b in the halogen bulb 11B is illuminated. Further, under the dimmer lighting in which the dimmer switch 40 has already been turned on, electrical power is supplied from the battery 32 to the filament 13b by way of the dimmer switch 40 and the relay contact 44a. Therefore, in the same manner as the case under the main lighting, the low-beam filament 13b in the halogen bulb 11B of the first lamp 11 is illuminated. In such a way, the low-beam filament 13b of the halogen bulb 11B is automatically illuminated when the discharge bulb 12 is unlighted or turned off.

In the first embodiment, it should be noted that the auxiliary low-beam filament in the halogen bulb will be lighted when the discharge bulb in the same headlight unit is turned-off or unlighted. In a case where both the discharge bulbs of the second headlights are turned-off or unlighted by any causes, both the auxiliary low-beam filaments will be lighted.

As described above, according to the headlight assembly of the first embodiment, since both the high-beam filament of the halogen bulb and the discharge bulb of each headlight unit are illuminated during the main lighting, it becomes possible to provide a sufficient amount of light during the main lighting with the reduced size reflectors. Further, during passing, only the high-beam filament of the halogen lamp of each headlight unit is used, the discharge bulb is not affected by repeatedly switching for passing, thus leading to lengthening the life of the discharge bulb.

Furthermore, even if the discharge bulb is unlighted for any reason, the low-beam filament of the halogen bulb is automatically illuminated, whereby the driver can safely continue to drive the vehicle without any difficulties, which results in increased reliability of the vehicle.

Figure 4:
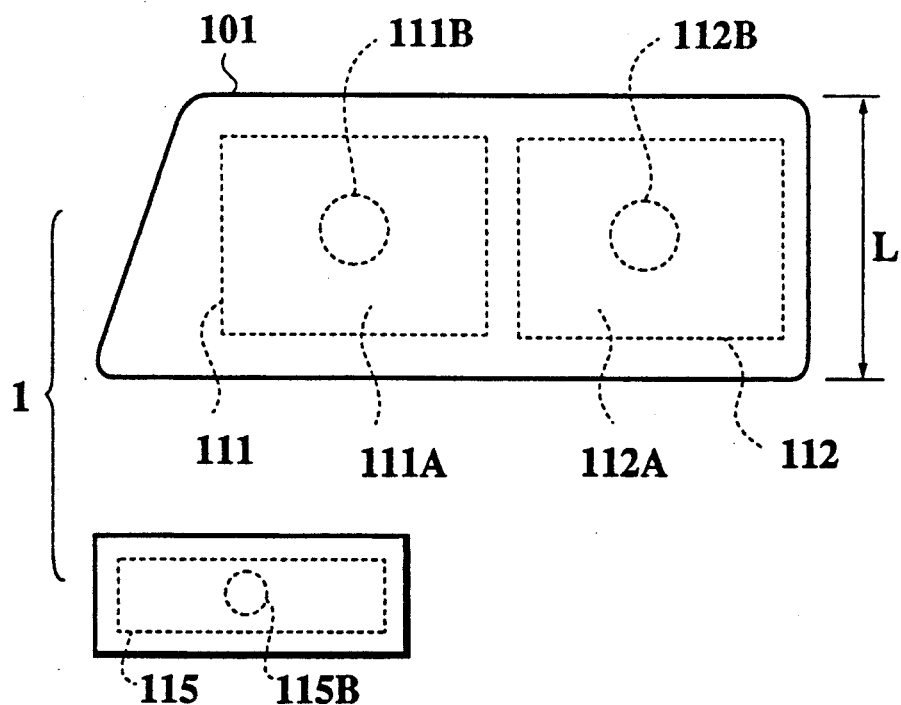
FIG. 4 is a schematic representation of one of the headlight units of a headlight assembly according to a second embodiment of the present invention.
Figure 5:
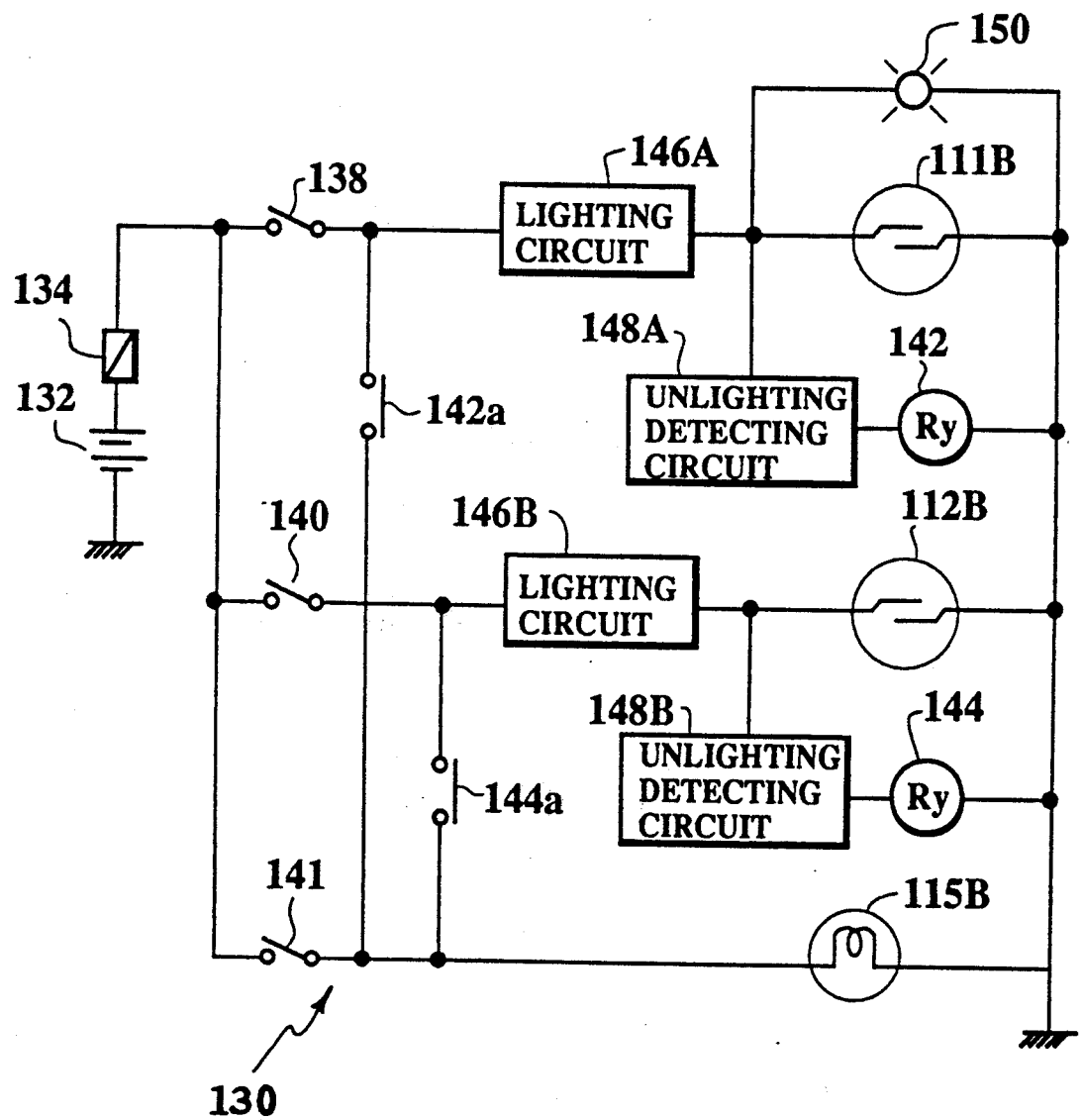
FIG. 5 is a circuit diagram of a lighting control circuit of the second embodiment.

FIGS. 4 and 5 show a second embodiment of the present invention. In the first embodiment, the halogen bulb 11B is used in the first headlight for high-beam, but in this second embodiment, a discharge bulb having a capacity which can provide a much larger amount of light compared with the halogen bulb is used for not only the first headlight but also the second headlight.

In this second embodiment, the headlight assembly also includes a pair of headlight units 101, 102 which are provided on a front portion of a vehicle as shown in FIG. 1. FIG. 4 is a schematic representation showing the left side headlight unit 1 according to the second embodiment. Each of the headlight units 101, 102 is composed of a first headlight 111 having a reflector 111A and a discharge bulb 111B for irradiating both high and low beams and a second headlight 112 having a reflector 112A and a discharge bulb 112B for irradiating a low-beam. The second headlight 112 is constituted in the same manner as the second headlight 12 of the first embodiment. Each of the headlight units of this headlight assembly further includes an auxiliary lamp 115 such as a foglamp which includes preferably a halogen lamp 115B therein.

FIG. 5 is a circuit diagram showing a configuration of a lighting control circuit 130 of the headlight assembly according to the second embodiment. In this regard, it should be noted that the first and second headlights 121, 122 of the other headlight unit 102 have been omitted from the drawing in order to simplify the explanation.

In the drawing, the reference numeral 132 denotes a battery and the numeral 134 denotes a fuse connected at one end thereof to the battery 132, which are the same as those of the first embodiment. The other end of the fuse 134 is connected to the lighting control circuit 130.

Namely, the other end of the fuse 134 is connected to one end of a main switch 138, one end of a dimmer switch 140, one end of an auxiliary lamp switch 141. The other end of the dimmer switch 138 is connected to an input terminal of a lighting circuit 146A and is also connected to the other end of the auxiliary switch 141 through a normally open relay contact 142a. The other end of the lighting circuit 146A is connected to one of the electrodes of the discharge bulb 111B of the first headlight 111 and is also connected to an input terminal of an unlighting detecting circuit 148A. An output terminal of the unlighting detecting circuit 148A is connected to one end of a relay 142 which is operated so as to close the relay contact 142a when the unlighting detecting circuit 148A detects that the discharge bulb 111B is unlighted or faded away.

The other end of the dimmer switch 140 is connected to an input terminal of a lighting circuit 146B and is also connected to the other end of the auxiliary lamp switch 141 though a normally open relay contact 144a. An output terminal of the lighting circuit 146B is connected to one end of electrodes of the discharge bulb 112B. The output terminal of the lighting circuit 146B is also connected to an input terminal of an unlighting detecting circuit 148B. An output terminal of the unlighting detecting circuit 148B is connected to a relay 144 which will be operated so as to close the relay contact 144a when the unlighting detecting circuit 148B detects that the bulb 112B is unlighted. The other end of the auxiliary lamp switch 141 is connected to one end of a filament of the auxiliary lamp 115B. In the drawing, the reference numeral 150 denotes a high-beam indicator, which is connected to the opposite electrodes of the discharge bulb 111B of the first headlight 111.

The other electrode of the discharge bulb 111B, the other end of the relay 142, the other electrode of the discharge bulb 112B of the second headlight 112, the other end of the relay 144 and the other electrode of the auxiliary lamp 115B are connected together, and then grounded.

The operation of the lighting control circuit 130 will be explained hereinbelow.

During the main lighting, electrical power is supplied from the battery 132 to the lighting circuit 146A by turning the main switch 138 on to illuminate the discharge bulb 111B for the main lighting with a high-beam and a low-beam, thereby illuminating the ranges both near to and faraway from the vehicle.

During the dimmer lighting, electrical power is supplied from the battery 132 to the lighting circuit 146B by turning the dimmer switch 140 on to illuminate the discharge bulb 112B for the dimmer lighting with a low-beam. In the same manner as mentioned above, the close vicinity of the vehicle is illuminated with the low-beam.

Upon detecting the turning-off or fading of the discharge bulb 111B of the first headlight 111 during the main lighting, the unlighting detecting circuit 148A is activated so as to close the relay 142. With this result, the power is supplied from the battery 132 to the halogen bulb 115B via the main switch 138 and the relay contact 142a, causing the auxiliary lamp 115B to illuminate. Likewise, upon detecting the turning-off or fading of the discharge bulb 112B of the second headlight 112 during the dimmer lighting, the unlighting detecting circuit 148B is activated so as to close the relay 144. Consequently, the power is supplied from the battery 132 to the halogen bulb 115B via the dimmer switch 140 and the relay contact 144a, causing the auxiliary lamp 115B to illuminate.

According to the second embodiment, the size of the headlight assembly can be further reduced, since the discharge bulb used in the first headlight can provide a sufficient amount of light with a reduced size reflector due to its characteristic as stated above. In addition, even if either of the discharge bulbs is turned off or unlighted, the auxiliary lamp 115B can be automatically illuminated. As a result, the driver can safely continue driving the vehicle without any difficulties, which results in increased reliability of the vehicle in the same manner as in the first embodiment.

What is claimed is:

1. A headlight assembly for a vehicle, comprising:
a pair of headlight units each including a first headlight having a halogen bulb with a high-beam filament for illuminating a range faraway from the vehicle, and a second headlight having a discharge bulb for a low-beam for illuminating a range in the vicinity of the vehicle; and means for controlling lighting of the headlights such that both bulbs of the first and second headlights are lighted during main lighting which illuminates the range faraway from the vehicle with a high-beam and the range close to the vehicle with a low-beam, such that the bulbs of the second headlights are lighted during dimmer lighting which illuminates the range in the vicinity of the vehicle with a low-beam, and such that only the bulbs of the first headlights are lighted during passing.

2. A headlight assembly according to claim 1, further comprising means for automatically producing low-beam lighting as a substitute for the discharge bulbs of the second headlights when at least one of the discharge bulbs is unlighted or turned off during the main or dimmer lighting.

3. A headlight assembly according to claim 2, wherein the low-beam lighting producing means comprises:
an auxiliary low-beam filament, provided in the halogen bulb of each first headlight in addition to the high-beam filament, for illuminating the range in the vicinity of the vehicle;
means, provided in the lighting controlling means, for detecting that either of the discharge bulbs of the second headlights of the headlight units is unlighted or turned-off; and
means, provided in the lighting controlling means, for supplying electrical power to the auxiliary low-beam filament of the first headlight of a headlight unit when the detecting means detects that the discharge bulb of the second headlight of the headlight unit is unlighted or turned-off, to cause the auxiliary low-beam filament to illuminate.

4. A headlight assembly according to claim 3, wherein the detecting means includes a comparator for comparing a discharge current from the discharge bulb with a predetermined value.

5. A headlight assembly according to claim 4, wherein the electrical power supplying means includes a relay which is operated so as to supply the electrical power to the auxiliary low-beam filament when the comparator detects that the discharge bulb is unlighted or turned-off.

6. A headlight assembly for a vehicle, comprising:
a pair of headlight units each including a first headlight having a halogen bulb with a first high-beam filament for illuminating a range distant from the vehicle and a second low-beam filament for illuminating a range in the vicinity of the vehicle, and a second headlight having a discharge bulb for a low-beam for illuminating a range in the vicinity of the vehicle;
means for controlling the lighting of the headlights such that the first high-beam filaments of the halogen bulbs of the first headlights and the bulbs of the second headlights are lighted during main lighting which illuminates the range faraway from the vehicle with a high-beam and the range close to the vehicle with a low-beam, such that the bulbs of the second headlights are lighted during dimmer lighting which illuminates the range in the vicinity of the vehicle with a low-beam, and such that only the first high-beam filaments of the halogen bulbs of the first headlights are lighted during passing;
means, provided in the lighting controlling means, for detecting that at least one of the discharge bulbs of the second headlights is unlighted or turned off; and means, provided in the lighting controlling means, for supplying electrical power to the second low-beam filament of the first headlight of a headlight unit when the detecting means detects that the discharge bulb of the second headlight of the headlight unit is unlighted or turned-off, to cause the second low-beam filament in the first headlight to illuminate.

7. A headlight assembly for a vehicle, comprising:

a pair of headlight units each including a first headlight having a discharge bulb for illuminating a range far distant from the vehicle with a high-beam and a range in the vicinity of the vehicle with a low-beam, a second headlight having a discharge bulb for illuminating a range in the vicinity of the vehicle, and an auxiliary lamp having a halogen bulb;

lighting control circuit means for controlling lighting of the headlights such that the discharge bulbs of the first and second headlights are lighted during main lighting which illuminates the range distant from the vehicle with a high-beam and the range in the vicinity of the vehicle with a low-beam, to illuminate both the ranges with the high- and low-beams, and such that the discharge bulbs of the second headlights are lighted during dimmer lighting which illuminates the range in the vicinity of the vehicle with a low-beam, to illuminate the range in the vicinity of the vehicle with the low-beam; and means for lighting the halogen bulb of the auxiliary lamp of a headlight unit when at least one of the discharge bulbs of the first and second headlights of the headlight unit is turned-off or unlighted during the main or dimmer lighting.

8. A headlight assembly according to claim 7, wherein the lighting means comprises:

means for detecting whether at least one of the discharge bulbs of the first and second headlights of the headlight unit is unlighted or turned-off; and means for supplying electrical power to the bulb of the auxiliary lamp of the headlight unit when the detecting means detects that the discharge bulb of the headlight unit is unlighted or turned-off, to cause the auxiliary lamp to illuminate.

* * * * *